Patented Feb. 16, 1943

2,311,046

UNITED STATES PATENT OFFICE 2,311,046

MANUFACTURE OF AROMATIC ISOCYANATES

Richard Greenhalgh and Henry Alfred Piggott, Blackley, Manchester, England, assignors to Imperial Chemical Industries Limited, a corporation of Great Britain No Drawing. Application October 12, 1937, Serial No. 168,668. In Great Britain October 14, 1936

1 Claim. (Cl. 260—453)

This invention relates to the manufacture of new aromatic isocyanates.

According to the invention we manufacture new aromatic isocyanates by reacting an aromatic amine of the general formula

where Ar is a residue of the benzene series which may carry substituents such, for example, as alkyl, alkoxy or nitro groups, or halogen atoms, R is an alkyl group of at least seven carbon atoms and X is —CH$_2$—, —O—, —S—, or

or a salt of such an amine, with phosgene.

In general, it is preferred to carry out the reaction at moderately elevated temperatures and in the presence of an inert diluent, for example, benzene or toluene. Hydrocarbon diluents of the type of benzene and its homologues are particularly valuable in that they dissolve the amine hydrochloride (which is formed in the reaction if not present originally) at least in part and thus enable the reaction to be carried out at a lower temperature.

For the purpose of carrying the invention into effect the amine hydrochlorides are convenient salts. Other salts may, however, be used but it is preferable if optimum yields of pure product are to be obtained to avoid those salts the acid radical of which is that of an acid which itself reacts readily with phosgene.

The new isocyanates of the present invention are in general pale-coloured or colourless crystalline solids which are insoluble in water but soluble in hydrocarbon solvents such as benzene, toluene, xylene and the like.

The new isocyanates are useful reagents for the synthesis of new organic compounds and they are useful in textile treatment processes.

The invention is illustrated but not limited by the following examples in which the parts are by weight.

Example 1

20 parts of p-cetylaniline are dissolved in 200 parts of benzene and the solution is saturated with gaseous hydrogen chloride whereupon much of the amine crystallises out in the form of the hydrochloride. The temperature of the mixture is raised to 50° C. and phosgene is passed in until a sample of the reaction mixture remains as a clear solution on cooling to room temperature. The benzene is evaporated off and the residue is distilled under diminished pressure, whereby p-cetylphenyl isocyanate is obtained in the form of a colourless oil, B. P. 260°–261° C./15 mm. which sets on cooling to a white solid. The yield is 88% of the theoretical.

p-Cetylaniline may conveniently be obtained by reacting cetyl alcohol with aniline hydrochloride in presence of zinc chloride: See U. S. Patent 2,118,493 to Samuel Coffey and Norman Hulton Haddock.

Example 2

By using 20 parts of p-dodecylaniline instead of p-cetylaniline in Example 1 p-dodecylphenyl isocyanate B. P. 230° C./25 mm. is obtained in a yield of 90% of theoretical.

p-Dodecylaniline may be obtained in a similar manner to that indicated for p-cetylaniline (see Example 1).

Example 3

13.5 parts of p-cetylaniline oxalate (which may conveniently be prepared from equimolecular proportions of p-cetylaniline and anhydrous oxalic acid in ether) are added to 40 parts of benzene and the mixture is warmed to 60° C., whereupon part of the oxalate dissolves. Phosgene is then passed through the mixture at 60° C. The salt gradually reacts and oxalic acid slowly separates out. When a sample of the reaction mixture remains as a clear solution on cooling to room temperature the oxalic acid is filtered off, the solvent is evaporated from the filtrate and the residue is distilled under diminished pressure. p-Cetylphenyl isocyanate is thus obtained in 70% yield.

Example 4

20 parts of p-dodecylaniline are dissolved in 80 parts of toluene. The solution so obtained is heated to 60° and a stream of phosgene is passed through it for several hours. At first the heat of reaction raises the temperature to 70° C. and a solid is precipitated which gradually goes into solution again as the reaction proceeds. When a sample of the reaction mixture remains as a clear solution on cooling to room temperature the solvent is evaporated off and the residue is distilled under diminished pressure. p-Dodecylphenyl isocyanate is thus obtained in a 61% yield.

Example 5

10 parts of p-dodecyl-o-toluidine are dissolved in 60 parts of benzene and the solution is saturated with dry gaseous hydrogen chloride, whereupon much of the amine crystallises out in the form of the hydrochloride. The temperature of the mixture is raised to 60° C. and phosgene is passed in until a sample of the reaction mixture remains as a clear solution on cooling to room temperature. The benzene is then evaporated off and the residue is distilled under diminished pressure. 4-dodecyl-2-methylphenyl isocyanate B. P. 192–199° C./4.5 mm., M. P. 24° C., is thus obtained, the yield being 80% of the theoretical.

The new isocyanate reacts immediately with aniline in benzene solution to form a urea which, after crystallisation from benzene has M. P. 135–137°.

p-Dodecyl-o-toluidine is prepared by causing dodecyl alcohol to react with p-toluidine and p-toluidine hydrochloride in the presence of zinc chloride: See U. S. Patent 2,118,493 to Coffey and Haddock.

Example 6

5 parts of 3-nitro-4-dodecylaniline are dissolved in 50 parts of toluene and the solution is saturated with gaseous hydrogen chloride whereby a precipitate of the amine hydrochloride is obtained. The temperature of the mixture is then raised to 60° C. and phosgene is passed in until a sample of the reaction mixture remains as a clear solution on cooling to room temperature. The toluene is then evaporated off, leaving a dark-coloured solid which is crude 3-nitro-4-dodecylphenyl isocyanate.

The new isocyanate reacts readily with aniline in a small amount of benzene, forming a urea, which when crystallised from a mixture of benzene and petroleum ether (B. P. 40–60° C.) has M. P. 103° C.

3-nitro-4-dodecylaniline may be prepared by nitrating 4-amino-1-dodecylbenzene: See U. S. Patent 2,118,494 to Samuel Coffey and Norman Hulton Haddock.

Example 7

9 parts of 2-nitro-4-dodecylaniline are dissolved in 55 parts of benzene and the solution is saturated with gaseous hydrogen chloride whereupon much of the amine is precipitated as the hydrochloride. The temperature of the mixture is then raised to 60° C. and phosgene is passed in until a sample of the reaction mixture remains as a clear solution on cooling to room temperature. The benzene is then evaporated off and the residue solidifies to a low-melting yellow solid which is very soluble in benzene and ligroin; it is crude 2-nitro-4-dodecylphenyl isocyanate.

The new isocyanate reacts immediately with aniline in solution in petroleum ether (B. P. 40–60° C.), forming a urea which crystallises in bright yellow needles from methanol, M. P. 98° C.

2-nitro-4-dodecylaniline may be prepared by nitrating the acetyl derivative of p-dodecylaniline and subsequently hydrolysing off the acetyl group: See U. S. Patent 2,118,494 to Coffey and Haddock.

Example 8

5 parts of p-aminophenyl cetyl ether are dissolved in 40 parts of benzene and the solution is saturated with gaseous hydrogen chloride whereupon much of the amine crystallises out in the form of the hydrochloride. The temperature of the mixture is then raised to 60° C. and phosgene is passed in, whereupon the suspended material gradually goes into solution. The addition of phosgene is continued until no separation of solid takes place when a sample of the reaction mixture is cooled to room temperature. The benzene is then evaporated off and the residue is distilled under diminished pressure. p-Cetyloxyphenyl isocyanate is thus obtained as a colourless oil, B. P. 206–210° C./3½ mm. which sets on cooling to a white crystalline solid, M. P. 37–39° C. The yield is 80% of theoretical.

p-Aminophenyl cetyl ether (M. P. 71–72° C.) may be obtained by hydrolysing the product from the reaction of sodium-p-acetaminophenoxide with cetyl bromide.

The new isocyanate reacts immediately with aniline in benzene solution forming a urea which crystallises from benzene in white plates M. P. 144° C.

Example 9

5 parts of p-aminophenyldodecyl sulphide hydrochloride are dissolved in 30 parts of boiling toluene and the solution is then cooled to 80° C. whereupon some of the hydrochloride crystallises out. Phosgene is then passed through the suspension at 80° C. The suspended material gradually goes into solution at 80° C. and the solution is kept saturated with phosgene by passage as necessary until, after about two hours, a sample of the reaction mixture remains as a clear solution on cooling to room temperature. The toluene is evaporated off and the residue is distilled under diminished pressure whereby p-dodecylthiophenyl isocyanate is obtained as a colourless oil, B. P. 204° C./3 mm., which sets on cooling to a white crystalline solid, M. P. 39–40° C. The yield is 88% of theory.

The isocyanate reacts immediately in ligroin solution with aniline to form a urea, which after crystallization from ethanol has M. P. 128–132° C.

p-Aminophenyldodecyl sulphite hydrochloride may be obtained by reducing p-nitrophenyldodecyl sulphide with stannous chloride and hydrochloric acid.

p-Nitrophenyldodecyl sulphide may be prepared by adding 39 parts of dodecyl bromide to a solution of 24.5 parts of p-nitrothiophenol and 3.6 parts of sodium in 250 parts of ethanol.

Example 10

5 parts of dodecyl p-aminobenzoate are dissolved in 50 parts of benzene and the solution saturated with gaseous hydrogen chloride whereby much of the amine crystallizes out in the form of the hydrochloride. The temperature of the mixture is raised to 50° C. and phosgene passed in. The suspended material gradually goes into solution at 50° C. and the passage of phosgene is continued until after about two hours a sample of the reaction mixture remains as a clear solution on cooling to room temperature. The benzene is evaporated off and the residue distilled under a diminished pressure whereby p-carbododecyloxyphenyl isocyanate is obtained as a colourless oil, B. P. 203° C./2.5 mm., which sets on cooling to a white crystalline solid, M. P. 40–42° C. The yield is 87% of theory.

The new isocyanate reacts readily with aniline to form a urea of M. P. 92–94°.

Dodecyl-p-aminobenzoate may be obtained by reducing the product from the reaction of p-nitrobenzoyl chloride with dodecyl alcohol: see U. S. Patent 2,155,493 to Arthur Howard Knight and Frank Lodge.

We claim:

p-Carbododecyloxyphenyl isocyanate.

RICHARD GREENHALGH.
HENRY ALFRED PIGGOTT.

CERTIFICATE OF CORRECTION.

Patent No. 2,311,046. February 16, 1943.

RICHARD GREENHALGH, ET AL.

It is hereby certified that error appears in the printed specification of the above numbered patent requiring correction as follows: Page 2, second column, line 36, for "sulphite" read --sulphide--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.